Feb. 16, 1926.
J. LEDWINKA
MOTOR VEHICLE
Filed Dec. 18, 1920
1,573,117
3 Sheets-Sheet 1
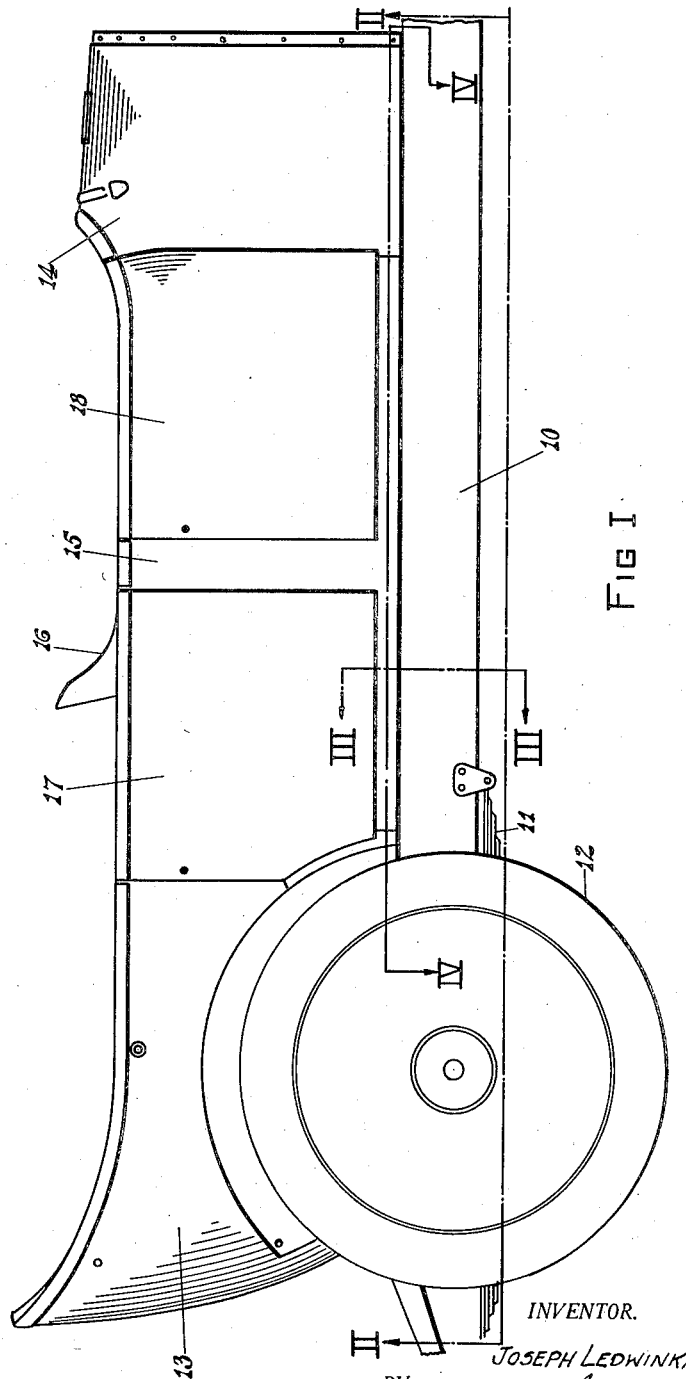
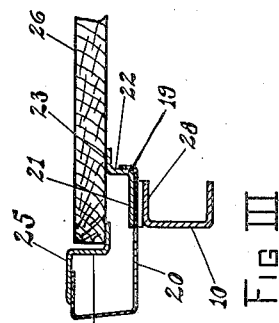
WITNESS:
Walter M. Prout
INVENTOR.
JOSEPH LEDWINKA
BY
C.B. Desjardins
ATTORNEY.

Feb. 16, 1926.
J. LEDWINKA
1,573,117
MOTOR VEHICLE
Filed Dec. 18, 1920
3 Sheets-Sheet 2
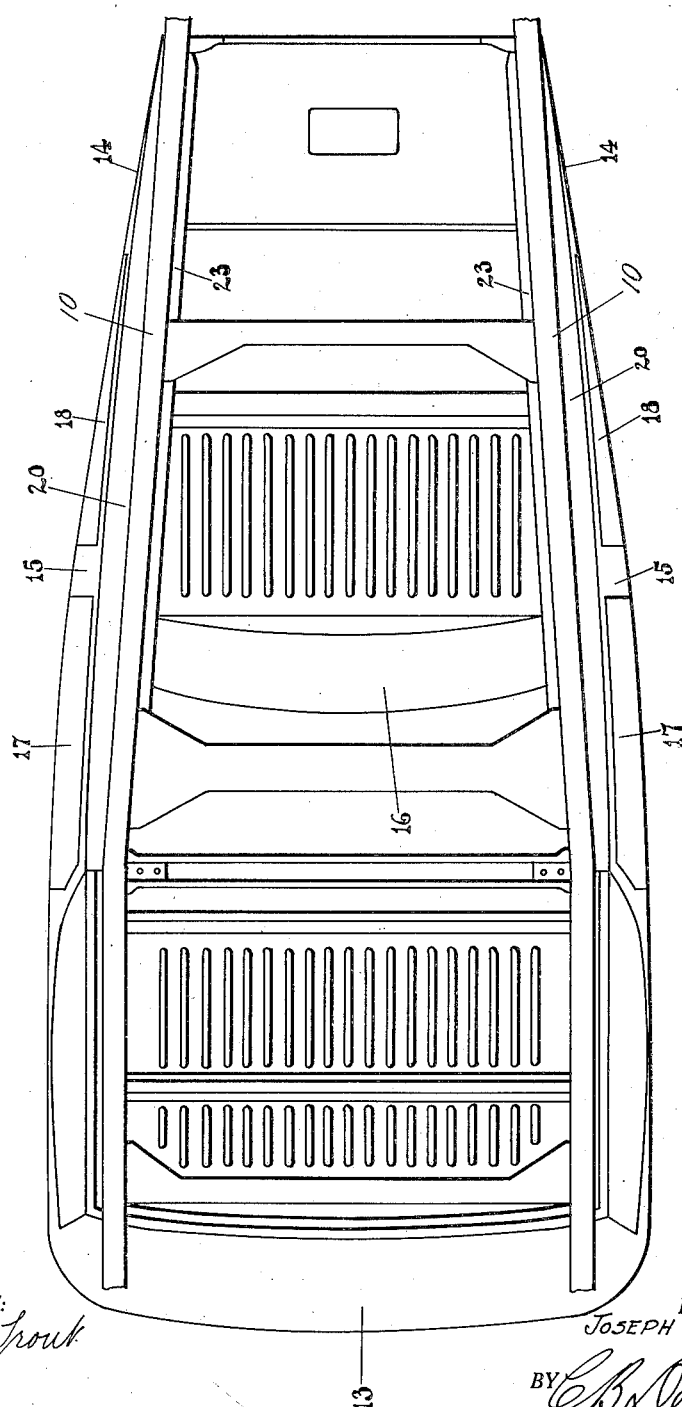
Fig II
WITNESS:
Walter M. Trout
INVENTOR.
JOSEPH LEDWINKA.
BY C. B. Desjardins
ATTORNEY.

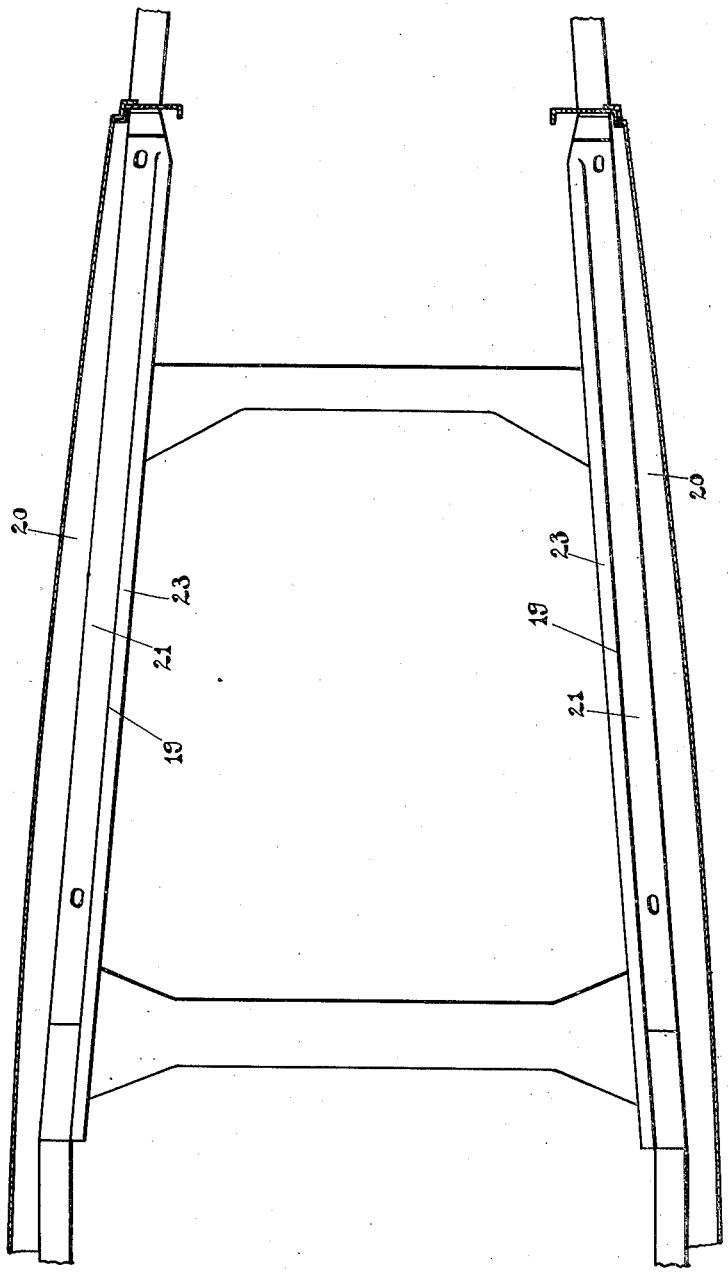

Patented Feb. 16, 1926.

1,573,117

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MOTOR VEHICLE.

Application filed December 18, 1920. Serial No. 431,732.

*To all whom it may concern:*

Be it known that I, JOSEPH LEDWINKA, a citizen of the United States, residing at Philadelphia, Pennsylvania, have invented certain new and useful Improvements in Motor Vehicles, of which I declare the following to be a full, clear, and exact description.

This invention relates to improvements in motor vehicles and has to do, more particularly, with the construction of bodies for motor vehicles and the mounting and support of such body constructions with reference to the chassis frame of the automobile.

One object of the invention, is to provide a motor vehicle having a simple, strong and durable body construction, mounted on the motor vehicle in a simple, strong and durable manner.

Another object of my invention is to provide a motor vehicle having a sheet metal body construction of such a nature, and mounted on and connected to the chassis frame of the motor vehicle in such a manner, that the resulting body construction is more rigid and the vibration largely reduced, affording a construction which will tend to retain its shape under conditions of use, notwithstanding the racking and twisting strains to which it is subjected.

Other objects of the invention will appear more fully hereinafter.

I accomplish the objects of my invention, in one instance, by the devices and means described in the following specification. My invention is clearly defined and pointed out in the appended claims. A structure, constituting a preferred embodiment of my invention, is illustrated in the accompanying drawing, forming a part of this specification, in which:—

Fig. I is a view in side elevation of a motor vehicle embodying my invention, the mud guard and running board being removed.

Fig. II is a bottom plan view of the body taken on the line II—II of Fig. I, the chassis frame being shown in relation thereto.

Fig. III is a detail sectional view, taken on the line III—III of Fig. I, the door being omitted.

Fig. IV is a longitudinal, sectional view taken on the line IV—IV of Fig. I.

In the drawings, similar reference numerals refer to similar parts throughout the several views, and the sectional views are taken looking in the direction of the little arrows at the ends of the section lines.

In general, my invention consists in providing a motor vehicle having a stronger body construction in the following respects. In the first place, the body construction is provided with body sills which extend longitudinally of the body and are straight throughout their length in order to resist the tendency to bulge outwardly under the force of vertical strains imposed on the body by the load, and which rest directly upon and are connected to correspondingly straight side members of the chassis frame so that the body sills, which form the main part of the framework of the all metal body, not only are straight from end to end, but also are aligned with the side members of the chassis frame in the sense of resting directly thereon and are connected thereto. It results from this, that there is a direct transfer of the load from the body sills to the chassis frame, and, further, that the construction is very much stronger because of the fact that these body sills are straight instead of curved from end to end.

Heretofore, it has been customary to employ body sills running along the sides of the body and conforming in curvature with the curve of the lower side portions of the body. The body curvature is determined by the body design, and, as a rule, the side panels of the body are curved longitudinally, so that the lower edge of the body does not follow a straight line and lies in a long sweeping curve extending from front to rear. Since, heretofore, the body sills have conformed to this curvature, it has been regarded as necessary to use longitudinally curved body sills, with the bulging portion of the curve presented outwardly. Furthermore, while the body sills have been curved longitudinally, as described, the side members of the chassis frame have generally been straight from end to end and the body has been supported from the chassis frame either by laterally-extending brackets which were fastened, at one end, to the chassis frame and, at the other end, to the body sill or by cross members of the body frame resting on the side members of the chassis frame and connected to the body sills, with the result that, in either case, the body sills overhang the chassis frame. I have found that, in motor vehicles having the body constructed and mounted in the manner referred to, trouble has arisen by reason of the tendency of the longitudinally curved body sills to curve or spring outwardly, under the stress of vertical strains imposed thereon when the body is in use. I have also found that, when the body is mounted on the chassis frame through lateral brackets or cross members, since the body sills lie largely outside of the margin of the chassis frame, there is a tendency for the sides of the body to sag and the middle to bulge upwardly. This interferes with the proper fit of the doors and other parts and renders the mounting of the body insecure, particularly when the motor vehicle is used with heavy loads or on rough roads where excessive vibrations are set up.

I have found that, if longitudinally straight body sills are employed in place of the usual longitudinally curved sills, such sills may be so positioned with reference to the side members of the chassis frame that, when mounted on the chassis frame of the motor vehicle, they are in line with, that is, they rest directly upon the side members of the chassis frame, so that the body sills are supported throughout their length by the side members of the chassis frame and may be directly connected thereto, thereby not only preventing any tendency of the body sills to bulge outwardly under the vertical strains to which they are subjected, but also securing greater strength and reducing body vibrations.

In general, I carry out the objects of my invention by providing a motor vehicle having a chassis frame with longitudinally straight side members and a body provided with longitudinally straight body sills which are connected to the lower portions of the body shell, and are in line with, that is, rest throughout their length directly upon and are connected to, the side members of the chassis frame. In the drawings. I have illustrated one embodiment of my invention which I have found to give very satisfactory service. In this particular embodiment of my invention, the motor vehicle comprises the chassis frame, having the side members 10, to which are connected the springs 11, and the wheels 12, in the usual or any convenient or well known manner. The body construction comprises the tonneau panel 13, the shroud panel 14, the side panels 15, and the front seat 16, with the front and rear doors, 18 and 17, positioned in the usual manner. The body construction also comprises a skeleton frame to which the lower portions of the body shell panels are externally applied. These body shell panels are curved to conform to the external curvature to be given to the body. The body frame includes, in general, a pair of body sills 19, which are longitudinally straight from end to end, and, in this particular embodiment of my invention, extend from the forward end of the body to the forward portions of the rear seat or tonneau. As I have stated, these body sills, 19, are longitudinally straight throughout their length while the lower outer portions of the body panels adjacent to these sills are longitudinally curved and spaced at varying distances from the sill. The body sills, if desired, may be connected by suitable cross members. The side panel, 15, and the shroud panel, 14, may have the laterally and inwardly turned flanges, 20, at their lower edges, which flanges are secured to lower horizontal portions, 21, of the straight body sills, 19. The body sills have the straight vertical portions, 22, and, if desired, the lateral upper flange, 23, which co-operates with the flange, 24, of the threshold strip, 25, forming a support for the floor board, 26.

The body is applied to the chassis frame of the motor vehicle so that the straight body sills, 19, rest throughout their length upon the side members, 10, of the chassis frame, and the body sills and the side members are directly connected together by bolts, passing through the horizontal portions, 21, of the body sills, and the upper flange, 28, of the side members, 10, of the chassis frame.

It is apparent from the foregoing description, that, in this construction, I have eliminated the longitudinally curved body sills and have secured a direct seating of the straight body sills upon the side members of the chassis frame. I have been able, by this construction, to secure a stronger and more rigid motor vehicle and a body construction in which the bulging tendency of the body sills is eliminated and there is a direct transmission of the body load to the chassis frame, thereby reducing or eliminating vibrations in the body structure in use of the vehicle.

The particular embodiment of my invention, which I have described and illustrated here, is susceptible of considerable variation, without departing from the spirit and scope of the invention, and, therefore, I wish to claim my invention broadly, as well as specifically, as indicated by the appended claims.

Having thus described my invention, what I claim as new and desire to secure by Letters Patent is:—

1. In a motor vehicle, the combination with the chassis frame having side members, and a body member having a body shell with an inwardly-extending flange at each side of the body at the lower side edges of said shell, said lower side edges of the body shell being longitudinally curved, of substantially straight longitudinally-extending body sills secured to said inwardly-extending flanges and spaced from the curved lower side edges of the body shell to rest longitudinally over and be secured to the side members of the chassis frame.

2. In a motor vehicle, the combination with the chassis frame having side members, and a body including side panels, each of said side panels having, at its lower edge, an inturned flange and the lower outside edge portions of each side panel being longitudinally curved, of longitudinally-extending straight body sills seated throughout their length over and secured to the side members of the chassis frame and secured to the inturned flanges at the lower edges of said side panels, said straight sills being variably spaced from the adjacent curved lower outside edge portions of the side panels.

3. In a motor vehicle, the combination with the chassis frame, having straight side portions, of a body structure including a sheet metal body panel having an inwardly-extending flange at its lower edge, the outer edge of said flange being longitudinally curved to conform to the body curvature, and said flange having a longitudinally straight girder portion at its inner edge, said girder portion resting throughout its length upon and secured to one of the side members of said chassis frame.

4. In a motor vehicle, the combination with the chassis frame, having side members, of a body including a body shell having inwardly-extending flanges at its lower edge, one at each side of the body, and longitudinally-extending, straight metallic angle members forming body sills secured to said flanges and resting throughout their length upon and secured to the side members of said chassis frame, the upper portions of said sills having laterally-extending flanges forming floorboard supports.

5. In a motor vehicle, the combination with a chassis frame having side members, of a body including a sheet metal body shell having inwardly-extending flanges at its lower edge, one at each side of the body, and longitudinally-extending, straight, pressed metal girders secured to said flanges and forming body sills, said girders being spaced at varying distances from the lines defined by the joint between said flanges and the body shell and resting directly over and secured to the side members of the chassis frame.

In testimony whereof, I affix my signature.

JOSEPH LEDWINKA.